United States Patent [19]

Duncan

[11] 3,843,099

[45] Oct. 22, 1974

[54] INSTANTANEOUS RATIONING MEANS
[75] Inventor: Robert J. Duncan, Magnolia, Mass.
[73] Assignee: USM Corporation, Boston, Mass.
[22] Filed: Feb. 26, 1973
[21] Appl. No.: 335,541

[52] U.S. Cl.................................. 259/23, 137/88
[51] Int. Cl............................................ B28c 7/04
[58] Field of Search............ 259/7, 8, 18, 154, 149, 259/5, 6, 21, 22, 23, 24, 25, 26, 9, 10; 222/129, 129.2, 129.3, 129.4, 133, 134; 137/87, 88

[56] References Cited
UNITED STATES PATENTS
3,495,808  2/1970  Klein...................................... 259/8
3,606,903  9/1971  Porter................................... 137/88
3,608,869  9/1971  Woodle.................................. 259/7
3,661,540  5/1972  Green................................... 137/88
3,794,301  2/1974  Simmonds............................... 259/7

Primary Examiner—Robert W. Jenkins
Attorney, Agent, or Firm—Ralph D. Gelling; Vincent A. White; Richard B. Megley

[57] ABSTRACT

Apparatus for controlling a mixer for dispensing multi-component material wherein the component materials are supplied substantially continuously in controlled ratio in a substantially concurrent mixing and dispensing cycle, by metering means having transducing means operatively connected thereto. The apparatus includes means to control the supply of a second component in a predetermined ratio to a first component, incorporating transducing means energized at a level to reflect said ratio information and wherein the outputs of transducing means operatively connected to said first and second component metering means may be directly compared as being in the same order of magnitude to a generated control signal to directly control metering of said second component material.

3 Claims, 1 Drawing Figure

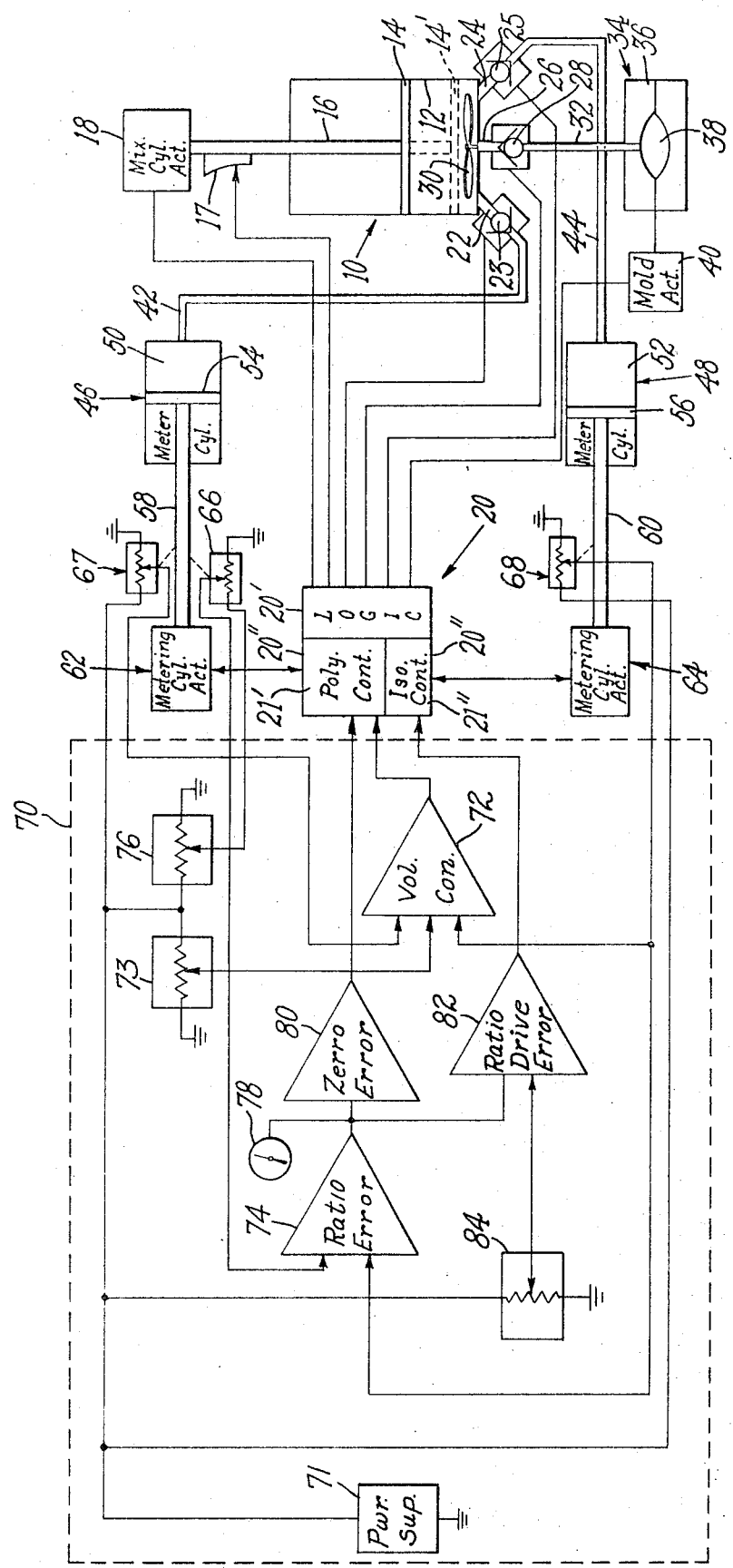

INSTANTANEOUS RATIONING MEANS

BACKGROUND OF THE INVENTION

The present invention relates to control apparatus for the mixing and dispensing of a multicomponent material wherein the basic liquid ingredients are charged into mixing apparatus according to a predetermined ratio, and, concurrently with the charging, the mixed material is dispensed. In preferred embodiments, the basic liquid ingredients, when combined, form a reactive mixture which still may be in a controlled reacting condition when dispensed from the mixer. Apparatus and method for such mixing and dispensing are disclosed in U.S. Pat. No. 3,794,301 granted Feb. 26, 1974 in the name of Robert C. Simmonds, Jr., and assigned to the assignee of the present invention.

As explained in the above application, the concurrent mixing and dispensing of component ingredients demands accurate control of the metering of the component ingredients. This is particularly true in those applications where the component ingredients are combined to form a reacting mixture which also must be carefully controlled. Prior art control apparatus for the mixing of ingredients, such as explained in said application, is directed to apparatus which works on a batch mixing and dispensing principle and is unsuitable when used to control continuous mixing and dispensing control imposed as with the present invention.

SUMMARY OF THE INVENTION

The present invention provides an improved apparatus which is directed to an accuracy of ratio control which has not previously been known in present mixing apparatus especially when used to control a continuous mixing and dispensing device. In particular, the invention related to the control of a continuing variable which is the composite of at least two component variables wherein the control of the components renders the overall control of the composite.

In accordance with certain features of the invention relative measurements of the individual components are compared and metering is controlled to cause the composite to have the components in a predetermined ratio. In its illustrated form, the control means includes means for supplying a first component, means for metering the first component supplied, means for generating a signal directly proportional to the metered first component, means for supplying a second component, means for metering the second component supplied, means for generating a signal directly proportional to the product of the predetermined desired ratio and the second component supplied, means for comparing the first and second component signals and generating an error signal directly proportional to the difference of the compared signals and means for generating a drive signal for controlling the supply means for said second component responsive to the error signal. It is also an object of the above invention to provide a control to maintain a predetermined desired ratio by means directly comparing generated signals proportional to the components metered and in the same order of magnitude.

A variety of controlled metering means are known in the art. Likewise, a variety of control techniques are familiar to those skilled in the art. However, known means generally require expensive, complex installations when high accuracies are necessary. The illustrated invention, contrary to conventional practice, provides controlled metering of high accuracy, with comparatively non-complex, inexpensive control devices.

DESCRIPTION OF THE DRAWINGS

The FIGURE, in block diagram form, illustrates control apparatus according to the invention.

DESCRIPTION OF THE PREFERRED EMBODIMENT

Referring now to the drawings, reference numeral 10 indicates a mixer of the type generally described in U.S. Pat. No. 3,794,301 granted Feb. 26, 1974 in the name of Robert C. Simmonds, Jr. As indicated therein, a typical mixer includes a chamber 12 and means such as a piston 14 for varying the volume of mixer 10. Piston 14 is closely received and slidably disposed in chamber 12 and connected to a piston rod 16. The piston rod is connected to activator means 18 for driving piston 14, to adjust the volume of chamber 12.

Extending into chamber 12 are first and second inlet ports 22 and 24 respectively. Preferably, valving means 23 and 25 are disposed within ports 22 and 24 to sequence inflow or shut-off of component materials into chamber 12. Extending centrally (preferably) out of the end of mixing chamber 12 opposite piston 14 is an outlet port 26 controllable by outlet valve 28. Mounted in chamber 12, generally adjacent inlet ports 22 and 24 and outlet port 26, is stirring means 30. Conveniently, stirring means 30 may be a propeller-like device for agitating the components being supplied to chamber 12 through ports 22, 24.

Outlet port 26 is connected through conduit means 32 to a receptacle 34 for the mixed product of chamber 12. In the illustrated embodiment, receptacle 34 includes mold means 36 having a molding cavity 38 therein. Reference is now made to U.S. Pat. Nos. 3,409,174 and 3,632,022 commonly owned with the present application as illustrative of sequential, batch-type mixing apparatus and associated hardware for the molding of polyurethane material, as is the presently described apparatus.

Inlet ports 22, 24 are connected through conduit means 42, 44 respectively to first and second component metering means 46, 48 respectively. It is to be understood that a variety of means such as continuous or intermittent pumps could be used to supply ingredients from bulk supplies. However, for illustrative purposes, metering means 46, 48 include cylinders 50, 52 having metering pistons 54, 56 closely received but slidably disposed therein. Metering pistons may be activated through rod means 58, 60 by motor means 62, 64.

In the illustrated embodiment, metering cylinder 50 may supply the polyhydroxyl component of the polyurethane compound to be formed in chamber 12. Cylinder 52 may supply the polyisocyanate component of the polyurethane compound to be formed. Component metering means 46, 48 include sensing means capable of generating a control signal directly related to the metered component delivered to chamber 12. In the instance of the illustrated measuring cylinders 50, 52, position transducers 66, 68 on polyhydroxyl and polyisocyanate piston rods 58 and 60 (respectively) supply an indication of piston 54, 58 location and thus either the rate or volume of component materials supplied by each means 46, 48.

Motor means 62, 64 may conveniently be hydraulically or electrically powered devices such as hydraulic or electrical motors (i.e., rotary or reciprocating, etc.) controllable through a master control means 20, as suggested in previously identified U.S. Pat. No. 3,794,301. The present invention is specifically related to ratio control means 70 of that application.

Master control means 20 may be functionally divided including logic section 20' which orders and controls the sequence of function of the mixing apparatus 10. Metering control section 20'' serves to direct the operation of metering means 46, 48 through actuators 62, 64. Thus section 20'' is divided into first component (polyhydroxyl) control section 21' and second component (polyisocyanate) control section 21''.

Ratio control means 70 functions to instruct control 20 of the preselected relative proportion of the component materials to be supplied and to maintain the proper predetermined ratio of components during the mixing and dispensing cycle. The elements and function of means 70 to perform this proportioning are subsequently described in detail.

In the typical operating cycle, mixing chamber 12 may supply mold 34 with a shot of polyurethane forming material, then rest until a subsequent molding operation is ready to be performed. During such rest period, the filled mold might be opened, emptied, and prepared for a subsequent shot immediately. The molding machine might also be equipped with a plurality of mold stations and a previously prepared station cycled into operative engagement with the mixing chamber. U.S. Pat. No. 3,632,022 is illustrative of such apparatus. It is also possible to use the apparatus in an extended operating cycle such as for the continuous extrusion of a mixed material.

During the sequential operation of mixer 10 to fill subsequent molds with a polyurethane forming composition, the chamber starts from a "rest" condition. In normal operating sequence, chamber 12 in the rest condition contains a residuum of material, being the remnants (subsequently described) of a previous mixing cycle. For convenience, this residuum may be rich in polyhydroxyl component ingredient so the mixture in the chamber is substantially non-reactive.

When mold 34 is ready for a shot, actuator 40 signals control 20 of the mold's readiness. Control 20 then opens valve 25 and actuates metering means 48 through master control 20 and actuator 64 to supply a quantity of polyisocyanate component ingredient through conduit 44 and port 24 to cylinder 12. This component is supplied in a quantity by the inventive apparatus calculated to bring the polyhydroxyl-rich residuum back to the normal predetermined relative proportion for controlled reaction. Concurrent with the addition of polyisocyanate component ingredient, control 20 enables chamber 12 to increase its volume conveniently by allowing piston 14 to be moved by the force of incoming material to reach a predetermined position. Transducer means 17 signals the travel of piston rod 16 and control 20 interrupts the actuation of actuator 18 and 64 when the mixture in chamber 12 is returned to a properly proportioned mixture, as signaled by the inventive apparatus.

Control 20 then actuates the inventive ratio control means 70 which causes the concurrent supply of component ingredients to chamber 10 by initiating metering of component ingredients from means 46, 48 through conduits 42, 44 and ports 22, 24 respectively. Control 20 concurrently causes opening of valves 23, 25 (25 may already be open from the previous operative step) and coordinately controls the increase of volume of chamber 10 which accommodates the increasing volume of the mixture since output valve 28 is still closed.

Ratio control 70, from the moment of actuation by control 20, receives feed back signals informative of the component ingredients actually metered, as through transducers 66, 68. Ratio control 70 also computes ratio information as subsequently described, all of which information is fed to control 20. This element of control allows metering means 46, 48 to bring the mixture "on ratio" (if not already at the preselected value) and also to supply a signal to control 20 when this condition is reached (zero error indication). In practice, the mixture may be brought "on ratio" by return of polyisocyanate in the previous step without additional metering being necessary.

Once control 20 receives the "on ratio" or zero error indication, the mixture in chamber 10 is ready to be dispensed, as into mold cavity 38. Valve 28 is opened, as initiated by control 20, and the reacting, polyurethane-forming mixture is injected into cavity 38. Metering means 46, 48 continues to supply component ingredients at proper ratio, as controlled by the inventive means 70. Control 20 causes adjustment of the volume of chamber 12 to an optimum mixing and dispensing volume of the reacting material.

Volume control means 72 monitors the combined amount of component materials supplied to chamber 12. In the illustrated embodiment, movement of pistons 54, 56 is detected by transducer means 67, 68 which are driven by rods 58, 60. Separate transducing means 67 for calculating the amount of polyhydroxyl component ingredients is utilized in the present invention due to the special function of means 66, subsequently described. The computed total quantity of component ingredients supplied to chamber 12 is compared to a preselected desired total quantity (shot size) and when this value is reached, control 20 observes the event. Control 20 may then signal shut-off of component materials (as by closing valves 23, 25 and terminating the metering of components by means 46, 48).

In the preferred embodiment, control 20 anticipates the completion of the supply of material to mold cavity 38 approaching the conclusion of the dispensing cycle. Under this condition control 20 causes the volume of material still remaining within chamber 12 to be reduced to a predetermined nominal level, insofar as is practical, to evacuate chamber 12 of the reacting mixing polyurethane-forming components. To this end control 20 causes actuation of actuator 18 to advance piston 14 toward outlet port 26. Once the piston has "bottomed out" (reached the predetermined minimum volume position), injection into mold 36 is complete.

Since there is a residuum of reacting polyurethane-forming material remaining within chamber 12, control 20 is programmed to dilute the residuum mixture to quench the polyurethane-forming reaction. In the illustrated embodiment, at the completion of injection, a predetermined quantity of polyhydroxyl component ingredient is supplied by metering means 46 through opened valve 23 and port 22. Concurrently, control 20 increases the volume of chamber 12 to accommodate the dilution of the residuum.

Success of the method and apparatus for mixing disclosed in U.S. Pat. No. 3,794,301 may be enhanced by the particular ratio control means disclosed and claimed herein. Ratio control 70 is conveniently illustrated in elemental electrical block diagram form; however, it should be understood that certain of the components might be readily substituted with known fluidic or mechanical equivalents.

Independent transducing means 66 and 67 are operatively engaged with metering means 46 to provide an electrical signal according to the relative position of rod 58 and the electrical excitation supplied to transducers 66, 67. In the illustrated embodiment, transducer 67 receives full rated excitation to provide an indication of quantity of component metered by movement of rod 58. Transducer 66 receives a reduced excitation, as subsequently described being biased to provide instantaneous automatic ratio compensated information.

Transducing means 68 is operatively connected to metering means 48 as by rod 60. Transducer 68 provides an electrical signal directly proportional to the quantity of component ingredient metered by means 48. The electrical signals of transducers 67 and 68 are supplied to summing means 72 which, in turn, may generate a signal responsive to the total volume of ingredients metered by means 46, 48 as detected by means 67, 68. In the preferred embodiment illustrated, the predetermined total volume desired to be dispensed by means 10 is supplied to control 72 by means of a calibrated potentiometer 73. Control 72 is of a type which, when the sum of inputs of transducers 67, 68 equals the desired value input at 73, provides an output signal. This signal may then be supplied to control 20 as a positive indication of the metering of required components such that control 20 may signal (through its logic) the next operative event.

The inventive control 70 includes a power supply 71, capable of producing stable control voltages. Power supply 71 is connected to transducer means 66, 68, potentiometer means 73, 76 and 84 all of which produce voltage signals directly proportional to adjustment of their movable arms. Potentiometer means 73 provides a voltage input to volume control 72 indicative of a desired predetermined volume to be dispensed by means 10. Potentiometer means 76 is the ratio input to control 70 being the basing means for transducer 66 and will be discussed in detail in connection with error control. Potentiometer means 84 provides a calibrated voltage signal to ratio drive control 82 which, in turn, responds to error control to provide component ingredients in proper ratio. Transducer means 68 is operatively connected to power supply 71 and mechanically to rod 58 so as to produce a voltage signal directly proportional to the position of rod 60 and thus piston 56 (and quantity of ingredient material thereby). The output signal of transducer means is also supplied to ratio error summing means 74. By coupling transducer 66 through ratio set potentiometer means 76, the excitation of the transducer 66 may be directly controlled. Since the output of transducer 66 is dependent on both movement of rod 58 and the excitation by the control of excitation, the output per unit of movement of the device may be directly controlled. This will be shown to be of significance in metering control accuracy and versatility.

As previously mentioned, the outputs of transducers 66, 68 are directly input to ratio error summing means 74. Within means 74 the value of the individual signals are compared and any difference noted. It is to be noted that due to ratio biasing of transducer 66, these input signals are of the same order of magnitude. Means 74 provides an output signal directly proportional to the difference of the input signals. This output of means 74 is then supplied to ratio drive control 82 to effect control of the metering of the component ingredients. Ratio drive control 82 may be a summing amplifier, and receives as an input the error signal from ratio error means 74. Control 82 also receives as an input a nominal signal (rate) for driving one of metering means 46, 48 (in the illustrated embodiment means 48) at a rate sufficient to hold the component ingredients on ratio, if initially on ratio and undisturbed by usual system/environmental instabilities. This ratio drive signal is input through ratio rate potentiometer means 84 which is operably connected to power supply 71. Ratio drive control 82 sums the input of ratio error (from 74) and ratio rate (from 84), producing an output signal which, in the illustrated embodiment, may be used to directly control operation of metering means 48 during the mixing cycle (as through control 20 and metering cylinder actuator).

Two principal advantages from the inventive control should be understood. In the development of an accurate error signal proportional to the value of ratio error, the present invention permits direct instantaneous measurement of component ingredients through measurement of physical movement of the metering means (46, 48). Further, control signals are generated, responsive to this physical movement which are directly comparable to generate an error signal. Through the biasing of one of the component ingredient measuring means (transducer 66) to effect its sensitivity of measuring to include proper rationing, the signal levels for control (inputs to ratio error means 74 from transducers 66, 68) may be compared on a generally one-to-one basis. This one-to-one comparison provides the greatest accuracy for the least cost in generating an error signal in the control 70.

To produce the above one-to-one comparability for error signal generation, as previously mentioned, transducing means 66 is energized through ratio potentiometer means 76 to provide the ratio information bias. In operation, transducer means 66 is energized (biased) through means 76 to a level wherein movement of metering piston 54 and rod 58 an amount sufficient to cause supply of component ingredient (polyhydroxyl) in proper ratio to chamber 12 (as compared to a unit quantity of component ingredient - polyisocyanate - from metering means 48) generates in transducer 66 a unit signal equal to the unit signal generated in transducer 68 by its unit movement. By such control philosophy, all signals for error sensing and control are of comparably equal level and value providing previously unknown simplicity of control scheme and accuracy.

The generation of a drive signal for one component ingredient which may be biased with the absolute error signal generated as illustrated in the embodiment described (through ratio drive control 82), permits a more direct application of control over metering of component ingredients than previously known. The more direct approach provides the simplicity of control scheme necessary to accomplish the required high accuracy as well as desired cost minimization.

The apparatus of the present invention has been here disclosed in basic form, as particularly adapted to the molding of polyurethane compound formed from polyhydroxyl and polyisocyanate component ingredients. Other fields of application of the instant apparatus, or modification thereof, are in application of coatings for sealing, adhering, protecting or decorating applications, the manufacture of laminates, or thermosetting extrusions or the like. It then will be apparent that many variations may be made in the disclosed apparatus to accommodate a particular need without departure from the spirit and scope of the invention as defined in the appended claims.

Having thus described my invention, what I claim as new and desire to secure by Letters Patent of the United States is:

1. In apparatus for dispensing a multicomponent composition provided by the mixing together of at least two components in predetermined ratio in a mixing chamber including means for supplying a first component to said chamber, means for supplying a second component to said chamber, means for metering said first component supplied to said chamber, and means for metering the second component supplied to said chamber, a component ratioing control means comprising:
   a. means driving said first component supply means at a predetermined value;
   b. means generating a signal directly proportional to said metered first component;
   c. means generating a signal directly proportional to the predetermined ratio of said first component to said second component;
   d. means biasing said second component metering means with said predetermined ratio signal;
   e. means for generating a signal directly proportional to said ratio biased, metered second component;
   f. means for directly comparing said first component metering signal and said second component ratio biased metering signal;
   g. means for generating an error signal directly proportional to the difference between said compared signals; and
   h. means for driving one of said component supply means responsive to said error signal in a manner which tends to reduce said error to zero.

2. Apparatus according to claim 1 wherein the component drive means responsive to said error signal is driven according to a value representing the sum of said error signal and a predetermined nominal driving value.

3. A control system for apparatus for mixing and dispensing a multicomponent composition provided by the mixing together of at least two component ingredients in a mixing chamber including means for supplying a first component to said chamber, means for supplying a second component to said chamber, means for metering the first component supplied to said chamber, means for metering the second component supplied to said chamber, said control system comprising:
   a. transducer means for generating a signal directly proportional to the first component metered;
   b. transducer means for generating a signal proportional to the second component metered;
   c. means for generating a signal directly proportional to the ratio of said first component to said second component;
   d. means for biasing said second transducer means with said predetermined ratio signal;
   e. means for generating a signal directly proportional to the difference of said first transducer signal and said biased second transducer signal; and
   f. means for controlling the supply of one of said components responsive to the differential signal in a manner which tends to reduce said difference to zero.

* * * * *